(12) United States Patent
Moore

(10) Patent No.: US 8,135,123 B2
(45) Date of Patent: Mar. 13, 2012

(54) METHODS, SYSTEMS, AND PRODUCTS FOR RESPONDING TO COMMUNICATIONS

(75) Inventor: Darryl Moore, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1108 days.

(21) Appl. No.: 11/649,028

(22) Filed: Jan. 3, 2007

(65) Prior Publication Data

US 2008/0159492 A1    Jul. 3, 2008

(51) Int. Cl.
*H04M 3/42* (2006.01)

(52) U.S. Cl. ............ 379/210.01; 379/67.1; 379/88.22; 379/88.23; 379/88.25; 455/412.2

(58) Field of Classification Search ........... 379/88.12, 379/210.01, 88.13, 88.14, 29.06, 67.1, 70, 379/72, 76, 85, 88.04, 88.22, 88.23, 88.25, 379/88.26, 167.08, 263; 455/426.1, 412.2; 1/1

See application file for complete search history.

(56) References Cited

U.S. PATENT DOCUMENTS

| | | | |
|---|---|---|---|
| 5,442,814 A | 8/1995 | Seo | |
| 5,594,784 A | 1/1997 | Velius | |
| 5,758,280 A | 5/1998 | Kimura | |
| 5,864,603 A | 1/1999 | Haavisto | |
| 5,905,774 A | 5/1999 | Tatchell | |
| 6,018,671 A | 1/2000 | Bremer | |
| 6,185,433 B1 | 2/2001 | Lele | |
| 6,208,852 B1 | 3/2001 | Konishi | |
| 6,263,216 B1 | 7/2001 | Seydoux | |
| 6,292,799 B1 * | 9/2001 | Peek et al. | 1/1 |
| 6,349,222 B1 | 2/2002 | Hafiz | |
| 6,483,897 B1 | 11/2002 | Millrod | |
| 6,505,163 B1 | 1/2003 | Zhang | |
| 6,763,090 B2 | 7/2004 | Che | |
| 6,792,263 B1 | 9/2004 | Kite | |
| 6,847,703 B2 * | 1/2005 | Shibuya | 379/88.14 |
| 6,901,255 B2 | 5/2005 | Shostak | |
| 6,947,738 B2 * | 9/2005 | Skog et al. | 455/426.1 |
| 6,993,119 B1 | 1/2006 | Zhang | |
| 7,027,569 B2 | 4/2006 | Price | |
| 7,139,554 B2 * | 11/2006 | Litwin, Jr. | 455/412.2 |
| 7,746,987 B1 * | 6/2010 | Becker et al. | 379/88.12 |
| 2005/0201534 A1 | 9/2005 | Ignatin | |
| 2006/0153354 A1 | 7/2006 | Brahm | |

* cited by examiner

*Primary Examiner* — MD S Elahee
(74) *Attorney, Agent, or Firm* — Scott P. Zimmerman PLLC

(57) ABSTRACT

Methods, systems, and products are disclosed for responding to a communication. The communication is received from a sender's address and is destined for a recipient's address. An audible message associated with the sender's address is retrieved. The audible message is sent to a server that stores messages associated with the sender.

15 Claims, 9 Drawing Sheets

US 8,135,123 B2

METHODS, SYSTEMS, AND PRODUCTS FOR RESPONDING TO COMMUNICATIONS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The exemplary embodiments generally relate to communications and to telecommunications and, more particularly, to message services and to auto-dialing.

We cannot always respond to communications. Often times we receive a communication, and we would like to respond, but circumstances do not permit a response. When driving, for example, we often receive a call, but, safety or circumstances may prevent the driver from accepting the call. We may receive an urgent email during a meeting, yet we do not want to appear rude or inattentive by typing a response. Whatever the circumstances, we have all received communications to which we cannot respond. What is needed, then, are methods, systems, and products for automatically responding to received communications.

SUMMARY

Exemplary embodiments provide methods, systems, and products for responding to received communications. When any type of communication is received, exemplary embodiments automatically respond to that communication. Exemplary embodiments, for example, may automatically respond with an audible message. The audible message may be a personalized, prerecorded response or a "canned" message. The audible message may be sent to the sender/originator of the received communication, or the audible message may be addressed to any other destination. When the communication is received, exemplary embodiments retrieve the appropriate audible message and automatically respond to the received communication. When the communication recipient cannot accept or respond to the communication, exemplary embodiments thus provide an automatic response on behalf of the recipient.

Exemplary embodiments include a method for responding to a communication. The communication is received from a sender's address and is destined for a recipient's address. An audible message associated with the sender's address is retrieved. The audible message is sent to a server that stores messages associated with the sender.

More exemplary embodiments include a system for responding to a communication. A processor communicates with memory, and the memory stores instructions for receiving the communication from a sender's address and destined for a recipient's address. An audible message associated with the sender's address is retrieved. The audible message is sent to a server that stores messages associated with the sender.

Other exemplary embodiments describe a computer program product for responding to a communication. The computer program product stores instructions for receiving the communication from a sender's address and destined for a recipient's address. An audible message associated with the sender's address is retrieved. The audible message is sent to a server that stores messages associated with the sender.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
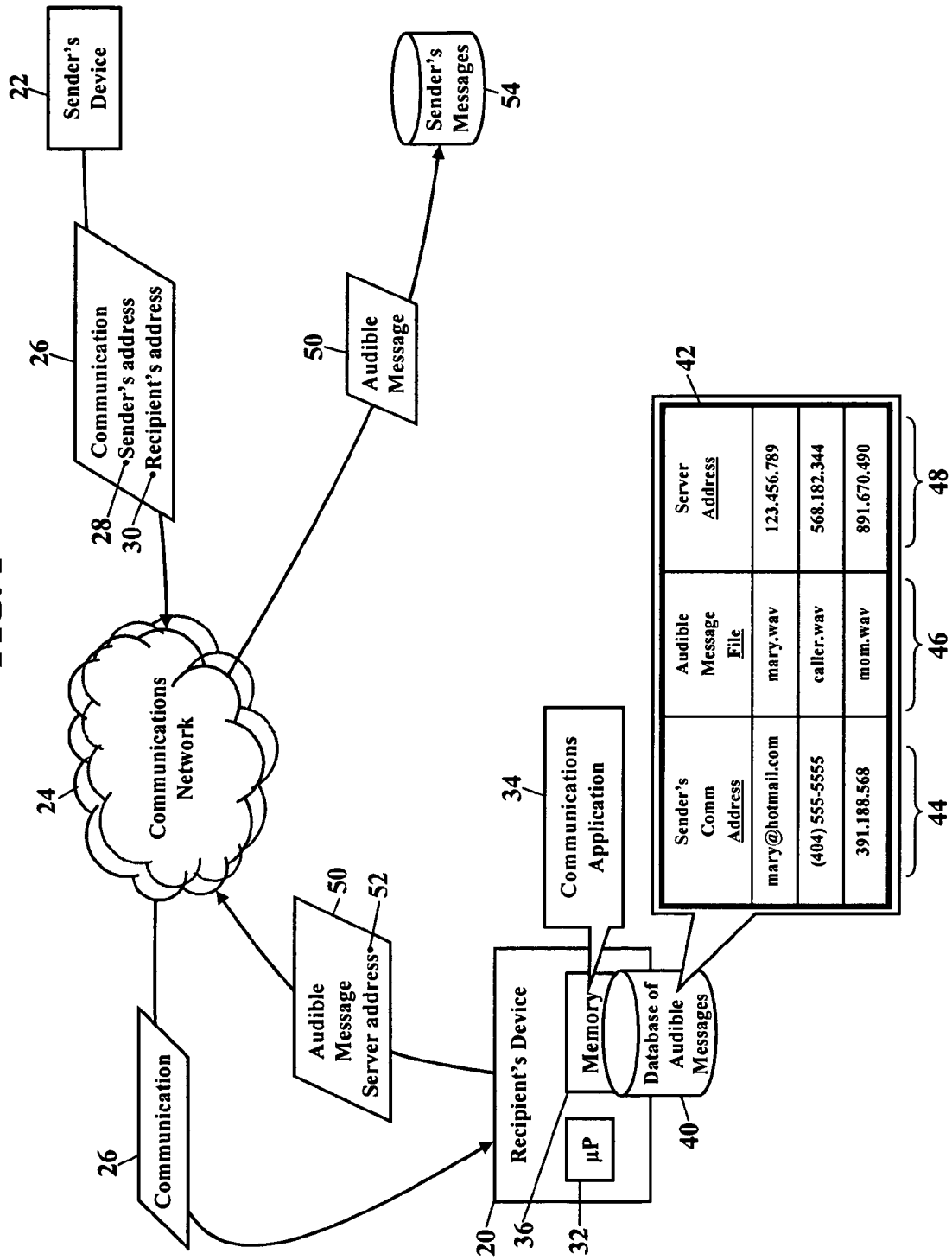
FIG. 1 is a schematic illustrating an environment in which exemplary embodiments may be implemented.

FIG. 1 is a schematic illustrating an environment in which exemplary embodiments may be implemented. A recipient's device 20 communicates with a sender's device 22 via a communications network 24. The recipient's device 20 receives a communication 26 from the sender's device 22. The communication 26 includes information that describes the sender's communications address 28 and the recipient's communications address 30. While the communication 26 is generically shown, the communication 26 may be any electronic communication or voice/telephone call. The recipient's device 20 has a processor 32 (e.g., "µP"), application specific integrated circuit (ASIC), or other similar device that executes a communications application 34 stored in memory 36. According to exemplary embodiments, the communications application 34 comprises processor-executable instructions that automatically respond to the received communication 26. The communications application 34 is thus a software engine that automates responses on behalf of the recipient.

As FIG. 1 illustrates, the communications application 34 queries a database 40 of audible messages. The communications application 34 may read, extract, or otherwise obtain the sender's communications address 28. The communications application 34 then queries the database 40 of audible messages. The database 40 of audible messages is illustrated as being locally stored in the memory 36 of the recipient's device 20, but the database 40 of audible messages may be remotely accessible via the communications network 24. The database 40 of audible messages, for example, is illustrated as a table 42 that maps, relates, or otherwise associates senders' communications addresses 44 to audible message files 46 and to server addresses 48. The communications application 34 queries the database 40 of audible messages, and the database 40 of audible messages responds with an audible message 50 that is associated with the sender's communications address 28. The response also includes a server address 52 that is associated with the sender's communications address 28.

The audible message 50 is then sent. The communications application 34 instructs the processor 32 to send the audible message 50 to the server address 52 associated with the sender's communications address 28. The server address 52 identifies a computer server or database 54 that stores messages associated with the sender. The audible message 50 is thus stored and/or queued for retrieval and review by the sender.

Exemplary embodiments thus automatically respond to incoming communications. When the communication 26 is received by the recipient's device 20, the communications application 34 instructs the processor 32 to automatically respond with the audible message 50. The audible message 50 may comprise any audible content that the recipient wishes to convey to the sender. Suppose, for example, that the recipient is driving in a car and cannot safely accept an incoming call. The communications application 34, however, may be configured to retrieve an appropriate audible message (e.g., "I'm driving and I can't accept your call. I'll return your call when my drive is completed."). The database 40 of audible messages may be configured with any number of audible messages that may be associated to various senders' addresses. Audible messages, for example, may be associated with email addresses, pager addresses, I.P. addresses, telephone numbers, or any other communications addresses.

The recipient may even define rules. The database 40 of audible messages may also store logical rules that describe the circumstances when an audible message is retrieved. The recipient, for example, may define audible messages according to any criteria or circumstance. Audible messages, for example, may be associated with certain times of the day, with certain days of the week, or even with certain modes of operation for the recipient's device 20. The recipient, for example, may associate an audible message for when the recipient's device 20 is engaged in a session or call. When the recipient's device 20 is receiving a streaming a video, for example, the user may specify a special audible message (e.g., "I'm currently watching a video, so I'll contact you when the video is completed."). The rules thus allow the recipient greater flexibility to customize automated responses.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), a wide-area network (WAN), or a satellite network. The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Some aspects of automated responses are known, so this disclosure will not greatly explain the known details. If the reader desires more details, the reader is invited to consult the following sources, all incorporated herein by reference in their entirety: U.S. Pat. No. 5,442,814 to Seo; U.S. Pat. No. 5,594,784 to Velius; U.S. Pat. No. 5,758,280 to Kimura; U.S. Pat. No. 5,864,603 to Haavisto et al.; U.S. Pat. No. 5,905,774 to Tatchell et al.; U.S. Pat. No. 6,018,671 to Bremer; U.S. Pat. No. 6,185,433 to Lele et al.; U.S. Pat. No. 6,208,852 to Konishi; U.S. Pat. No. 6,263,216 to Seydoux et al.; U.S. Pat. No. 6,349,222 to Hafiz; U.S. Pat. No. 6,483,897 to Millrod; U.S. Pat. No. 6,505,163 to Zhang et al.; U.S. Pat. No. 6,763,090 to Che et al.; U.S. Pat. No. to 6,792,263 to Kite; U.S. Pat. No. 6,901,255 to Shostak; U.S. Pat. No. 6,993,119 to Zhang et al.; U.S. Pat. No. 7,027,569 to Price; U.S. Patent Application Publication 2005/0201534 to Ignatin; and U.S. Patent Application Publication 2006/0153354 to Brahm et al.

Figure 2:
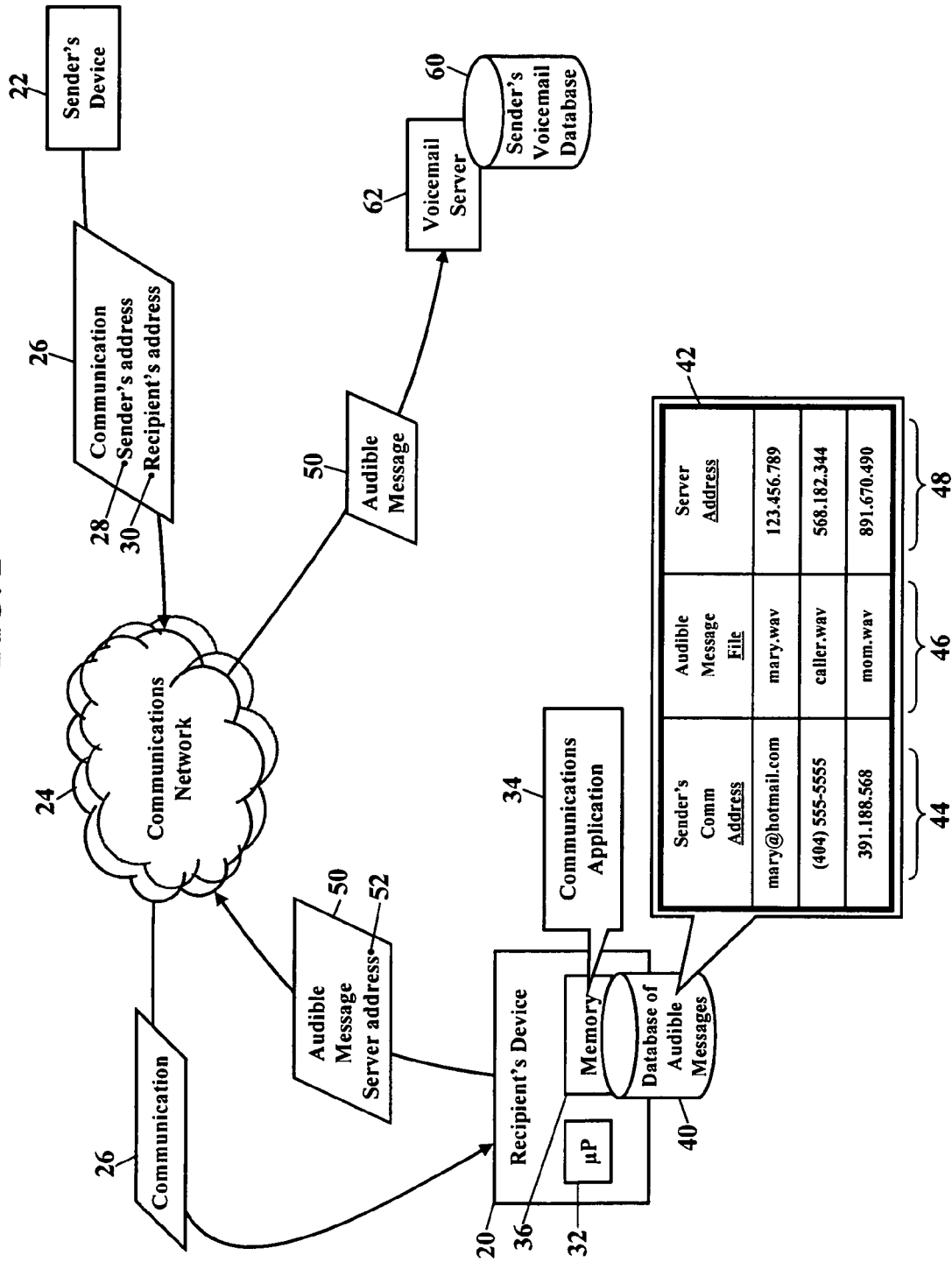
FIG. 2 is a schematic illustrating a voicemail database, according to more exemplary embodiments.

FIG. 2 is a schematic illustrating a voicemail database 60, according to more exemplary embodiments. The voicemail database 60 stores or maintains the sender's voicemail messages. The voicemail database 60 is illustrated as being remotely accessible via the communications network 24, yet the voicemail database 60 may be locally stored in the sender's device 22. The voicemail database 60 may be stored in the memory of a voicemail server 62. The voicemail database 60 stores the sender's voicemail messages. The voicemail database 60 may maintain a profile or account associated with the sender's communications address 28, and the voicemail database 60 maps, relates, or otherwise associates voicemail messages to the sender's communications address 28. According to exemplary embodiments, when the recipient's device 20 receives the communication 26, the communications application 34 queries the database 40 of audible messages for an audible message that is associated with the sender's communications address 28. The communications application 34 also retrieves the server address 52 and, in this embodiment, that server address 52 identifies the voicemail server 62 that stores the sender's voicemail messages.

The audible message 50 is then sent. The communications application 34 instructs the processor 32 to send the audible message 50 to the server address 52 associated with the voicemail server 62. The audible message 50 is thus stored and/or queued for retrieval and review with the sender's other voicemail messages. The audible message 50 may have any file formatting, such as a .wav file, .mp3/4 file, or any other file format suitable for audible messages. The communications application 34 may even convert or reformat the audible message 50 to suit the voicemail server 62. The audible message 50 may even be a voicemail message that the recipient has pre-recorded and associated with the sender's communications address 28. When the sender accesses the voicemail messages stored in the voicemail database 60, the recipient's automated, audible message 50 may then be reviewed by the sender.

Figure 3:
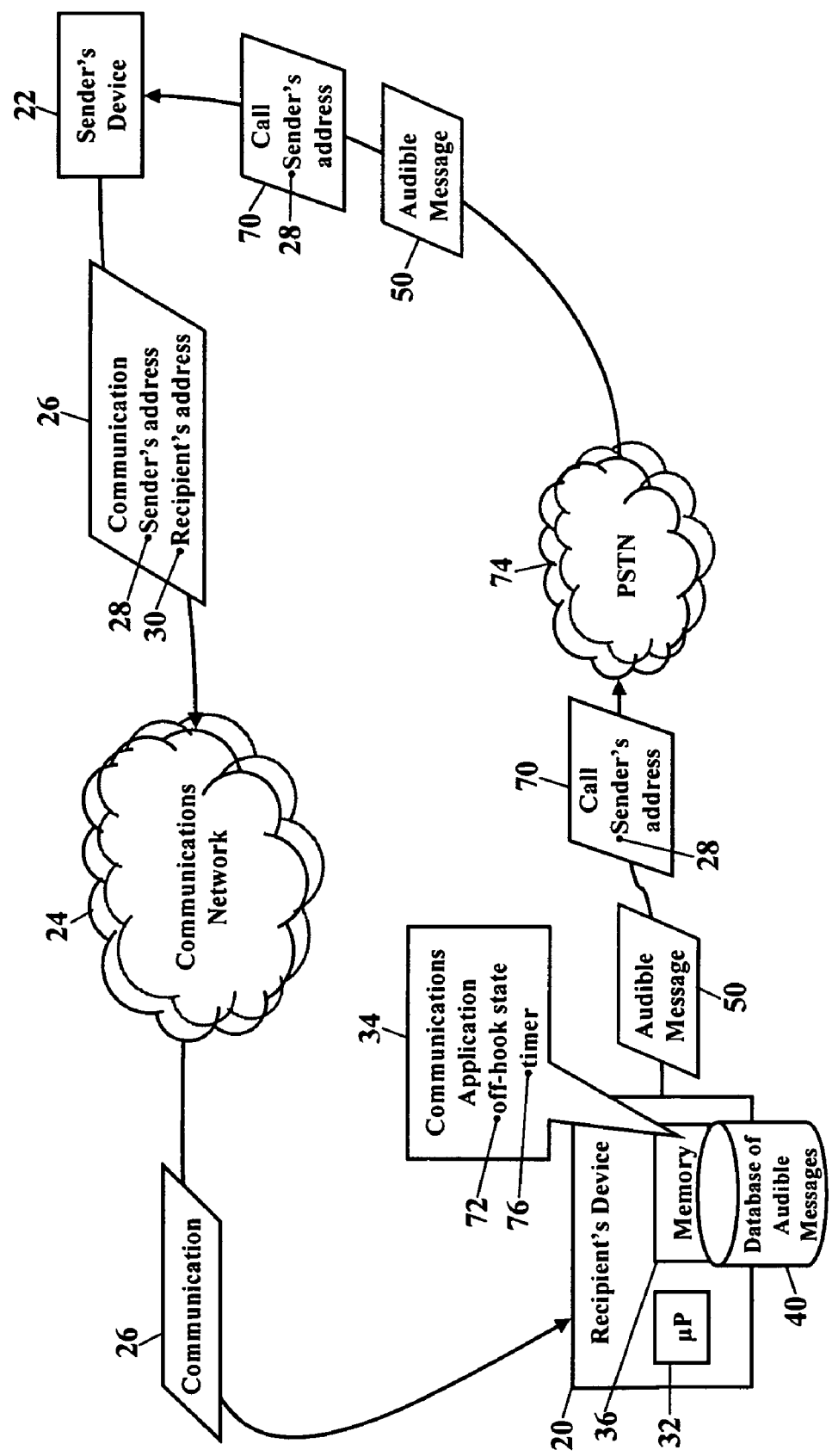
FIG. 3 is a schematic illustrating an automatically-initiated return call, according to even more exemplary embodiments.

FIG. 3 is a schematic illustrating an automatically-initiated return call, according to even more exemplary embodiments. Here, when the recipient's device 20 receives the communication 26, the communications application 34 may extract the sender's communications address 28 and automatically initiate a call to the sender. When the recipient's device 20 receives the communication 26, the communications application 34 again queries the database 40 of audible messages for the audible message associated with the sender's communications address 28. According to exemplary embodiments, the communications application 34 retrieves the associated audible message 50 and then the communications application 34 sets up or initiates a call 70 to the sender's communications address 28. As FIG. 3 illustrates, the communications application 34 instructs the processor 32 to enter an "off-hook" state 72 or mode of operation and audibly present or auto-dial DTMF tones that represent the sender's communications address 28. The call 70, for example, may be sent over a wireline connection to a Public Switched Telephone Network 74. If the recipient's device 20 is wireless or mobile, the call 70 may be wirelessly sent to a receiver, base station, or Mobile Telephone Switching Office (or "MTSO") for traversal along the Public Switched Telephone Network 74. Initialization and call set-up, however, are well-known to those of ordinary skill in the art and, thus, not greatly explained.

The communications application 34 may then play the audible message 50. After the communications application 34 automatically initiates the call 70, the communications application 34 may then play the audible message 50. According to exemplary embodiments, because the call 70 was initiated to the sender's communications address 28, the call 70 is connected to the sender's device 22. The communications application 34 then plays the audible message 50, thus providing an automatically-initiated return call that responds to the sender's communication 26.

Before the audible message 50 is played, however, a delay may be desired. When the communications application 34 automatically initiates the call 70, the communications application 34 may be configured to wait a predetermined time before playing the audible message 50. Set-up and routing of the call 70 may require some time (such as 1-10 seconds). Time may also be needed to account for ring signals (e.g., one to four rings). The communications application 34, then, may be configured with a timer 76 to account for call set-up and ring. After the communications application 34 instructs the processor 32 to enter the "off-hook" state 72 and auto-dial the DTMF tones of the sender's communications address 28, the communications application 34 begins decrementing the timer 76. When the timer 76 counts down to its final value (e.g., zero), the communications application 34 plays the audible message 50. After the audible message 50 is entirely played, the communications application 34 instructs the processor 32 to enter an "on-hook" state, thus terminating the call 70. The communications application 34 also resets the timer 76 to an initial value.

Figure 4:
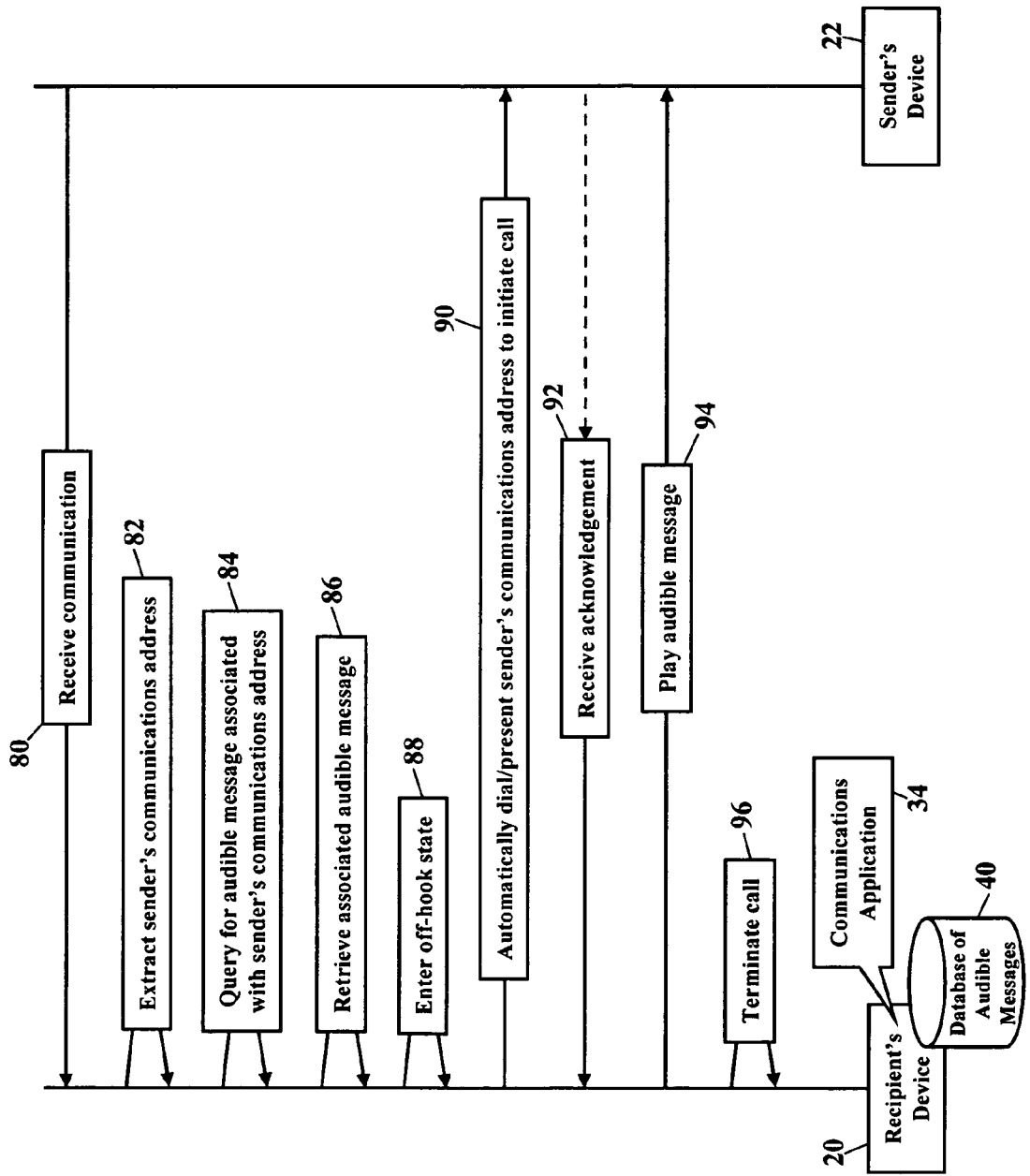
FIGS. 4-7 are schematics illustrating a process for automatically-initiating a return call, according to still more exemplary embodiments.

FIG. 4 is a schematic illustrating a process for automatically-initiating a return call, according to still more exemplary embodiments. Here the communications application 34 receives an acknowledgement before playing the audible message. The recipient's device 20 receives the communication (Step 80) and extracts the sender's communications address (Step 82). The database 40 of audible messages is queried for the audible message associated with the sender's communications address (Step 84). The communications application 34 retrieves the associated audible message (Step 86), enters the "off-hook" state (Step 88) and automatically dials or presents the sender's communications address to automatically initiate a call (Step 90).

An acknowledgement is then received (Step 92). The acknowledgement is any information that indicates the call has been established with the sender's device 22. The acknowledgement, for example, may be a tone or other signal that indicates a telephony connection has been established with the sender's device 22. This tone or signal may be sent or produced by the sender's device 22 or by some network component (such as a switch or server). The acknowledgement may additionally or alternatively be a data message. When a connection is established with the sender's device 22, the communications application 34 may receive a data message. The data message may be sent by the sender's device 22 or by some network component (such as a switch or server). The data message includes information that indicates the sender (e.g., the automatically-called party) has answered the call. Even though the call is established, because the data message may be sent/received outside a voice band, the data message may be received during the established call (similar to Call-Waiting and Caller-ID messages during an established telephone call). However the acknowledgement is presented, the audible message is then played (Step 94). After the audible message 50 is played, the communications application 34 instructs the processor 32 to enter an "on-hook" state to terminate the call (Step 96). The communications application 34 thus provides an automatically-initiated return call that responds to the sender's communication 26.

Figure 5:
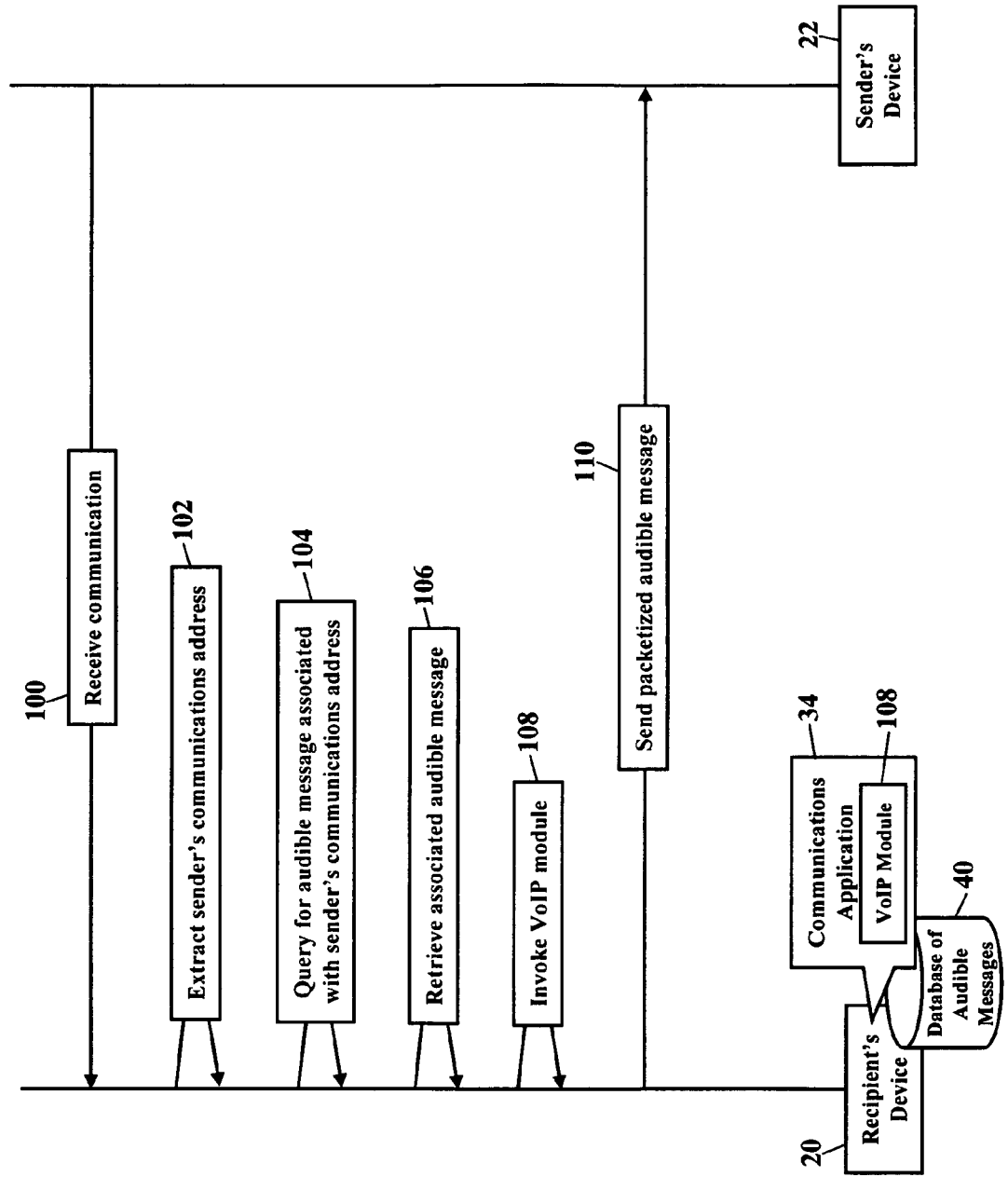

FIG. 5 is a schematic illustrating yet another process for automatically-initiating a return call, according to even more exemplary embodiments. The recipient's device 20 receives the communication (Step 100), extracts the sender's communications address (Step 102), queries the database 40 of audible messages (Step 104), and retrieves the associated audible message (Step 106). Here, however, the communications application 34 invokes a VoIP module 108 (Step 110) to packetize the audible message as a call for transmission over the communications network (shown as reference numeral 24 in FIGS. 1-3). The VoIP module 108 creates packet headers that describe the destination address (e.g., the sender's communications address 28 shown in FIGS. 1-3). The packetized audible message is then sent/routed to the destination (Step 112). Basic Voice-over Internet Protocol techniques are well-known to those of ordinary skill in the art, so VoIP need not be further explained. If the reader desires more explanation, the reader is invited to consult the following references, with each incorporated herein by reference in their entirety: FRANK GROOM & KEVIN GROOM, THE BASICS OF VOICE OVER INTERNET PROTOCOL (2004); and TIMOTHY BURKE & LAWRENCE D. GASMAN, THE FUTURE OF VOICE/DATA CONSOLIDATION: MARKETS, TECHNOLOGIES, AND STRATEGIES (2006) (both available from the International Engineering Consortium, 300 W. Adams Street, Suite 1210, Chicago, Ill. 60606-5114 USA).

Figure 6:
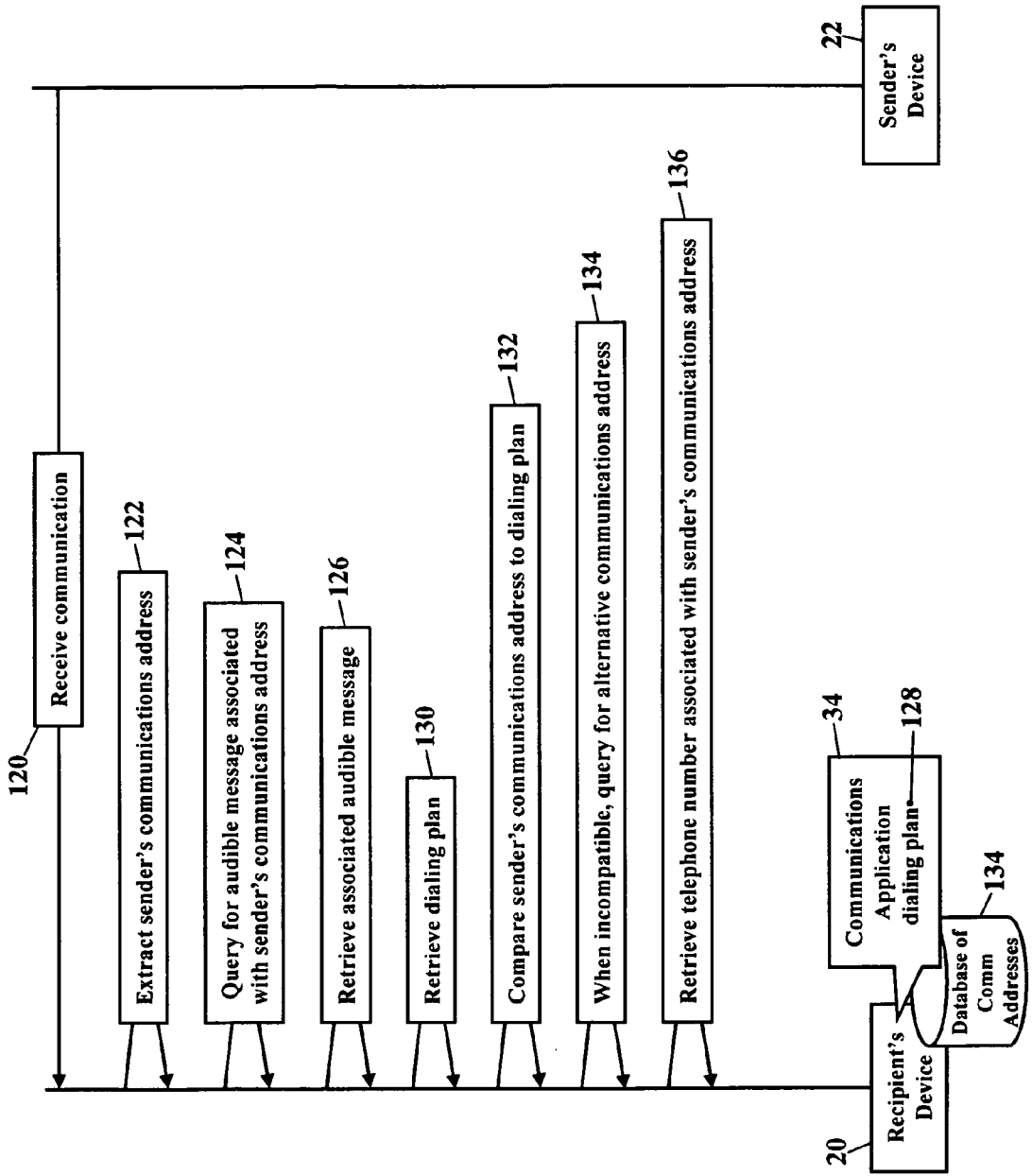
Figure 7:
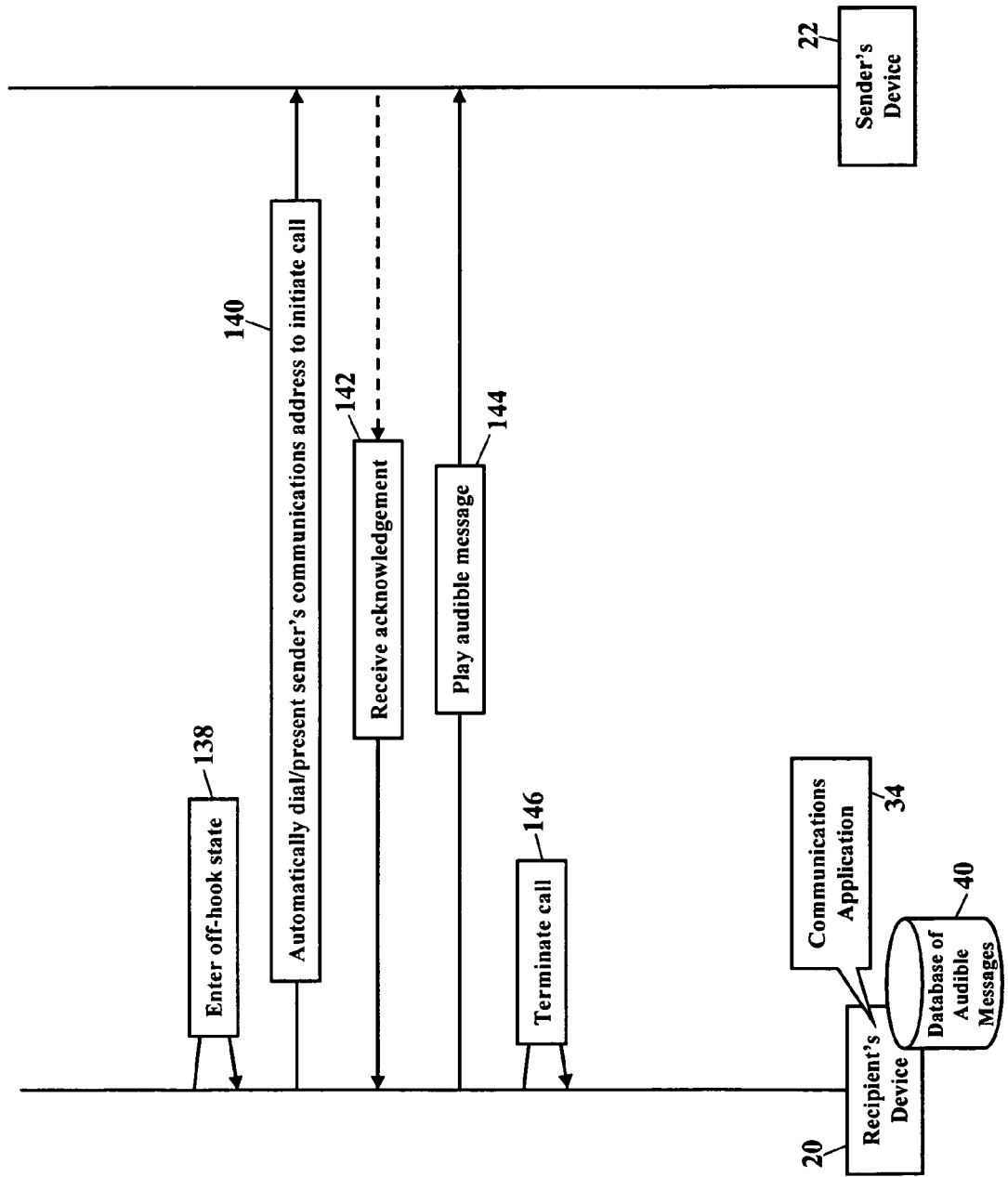

FIGS. 6 and 7 are schematics illustrating another process for automatically-initiating a return call, according to more exemplary embodiments. The recipient's device 20 receives the communication (Step 120), extracts the sender's communications address (Step 122), queries the database 40 of audible messages (Step 124), and retrieves the associated audible message (Step 126). Here, however, the communications application 34 may retrieve a dialing plan 128 from memory (Step 130). The dialing plan 128 represents any recognized dialing nomenclature (such as the North American Numbering Plan or the Numbering Plan Areas) that is required to initiate a call to the sender. The sender's communications address is then compared to the dialing plan 128 (Step 132). When the sender's communications address is incompatible, then the communications application 34 queries a database 134 of communications ("comm") addresses (Step 134). The database 134 of communications addresses is illustrated as being locally stored in the recipient's device 20, but the database 134 of communications addresses may be remotely accessible via the communications network (shown as reference numeral 24 in FIGS. 1-3). The database 134 of communications addresses maps, relates, or otherwise associates alternative communications addresses to the extracted sender's communications address (e.g. Step 122). The communications application 34 queries for an alternative communications address that is formatted according to the dialing plan 128. The communications application 34 thus retrieves a telephone number associated with the sender's communications address (Step 136).

The process continues with FIG. 7. A call is then automatically initiated. The communications application 34 sets the recipient's device 20 to the "off-hook" state (Step 138) and automatically dials or presents the retrieved telephone number to automatically initiate a call (Step 140). An acknowledgement is received that indicates the call has been established to the retrieved telephone number (Block 142). The audible message is played (Step 144). After the audible message 50 is played, the communications application 34 instructs the processor 32 to enter an "on-hook" state to terminate the call (Step 146). The communications application 34 thus provides an automatically-initiated return call that responds to the sender's communication 26.

Figure 8:
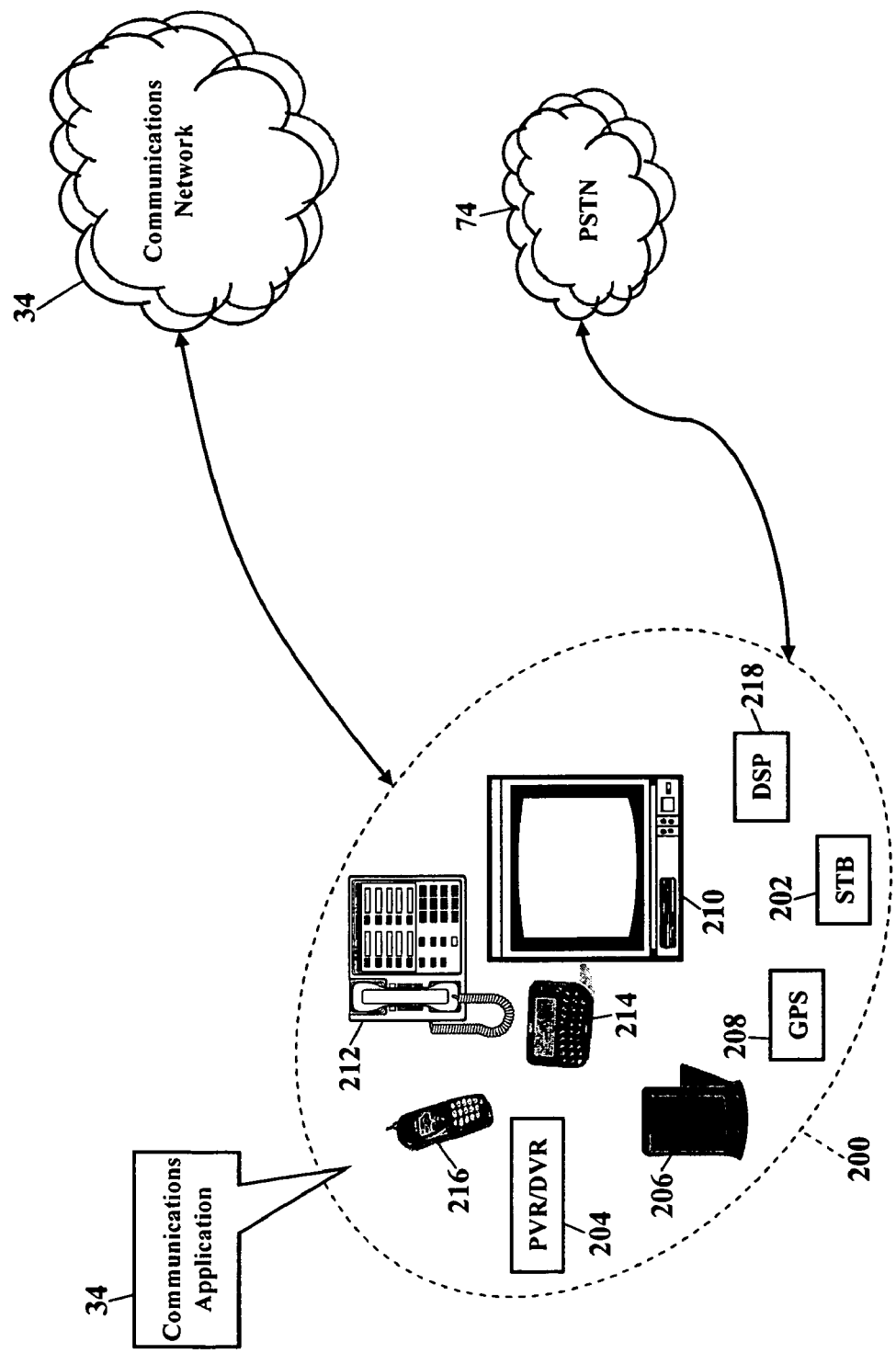
FIG. 8 depicts other possible operating environments for additional aspects of the exemplary embodiments.

FIG. 8 depicts other possible operating environments for additional aspects of the exemplary embodiments. FIG. 8 illustrates that the communications application 34 may alternatively or additionally operate within various other devices 200. FIG. 8, for example, illustrates that the communications application 34 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The device 200 may also include watches, radios, vehicle electronics, clocks, printers, gateways, and other apparatuses and systems. Because the architecture and operating principles of the various devices 200 are well known, the hardware and software componentry of the various devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known Subscriber Identity Modules, Functional Characteristics (GSM 02.17 V3.2.0 (1995-01))"; the GSM Standard 11.11, formally known as Specification of the Subscriber Identity Module—Mobile Equipment (Subscriber Identity Module—ME) interface (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); EDWARD M. SCHWALB, iTV HANDBOOK: TECHNOLOGIES AND STANDARDS (2004); ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Figure 9:
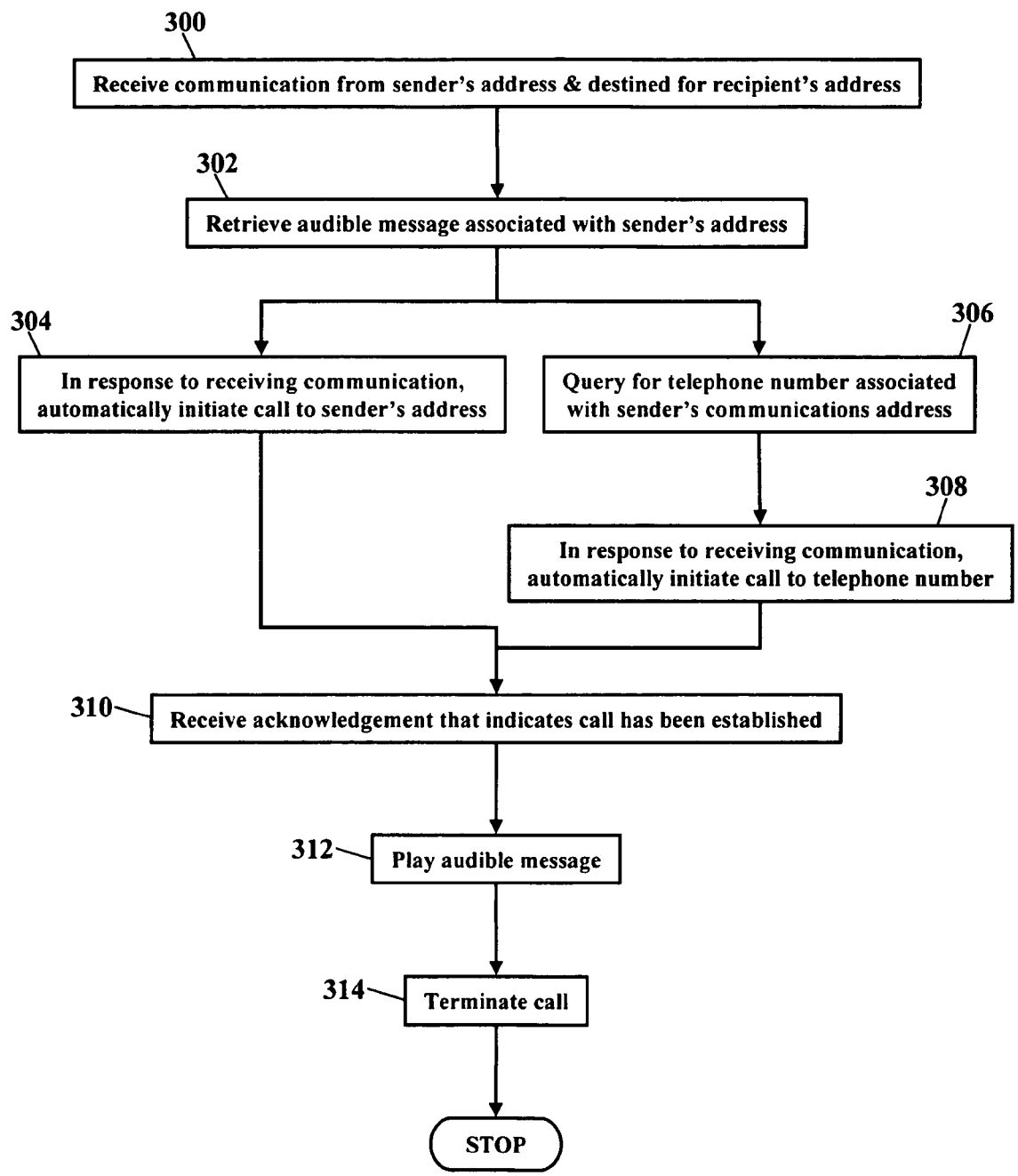
FIG. 9 is a flowchart illustrating a method of responding to a communication, according to exemplary embodiments.

FIG. 9 is a flowchart illustrating a method of responding to a communication, according to exemplary embodiments. The communication is received from a sender's address, and the communication is destined for a recipient's address (Block 300). An audible message associated with the sender's address is retrieved (Block 302). In response to receiving the communication, a call may be automatically initiated to the sender's address (Block 304). Alternatively, a query may be made for a telephone number associated with the sender's communications address (Block 306). In response to receiving the communication, a call may be automatically initiated to the telephone number (Block 308). An acknowledgement is received that indicates the call has been established (Block 310). The audible message is played (Step 312) and an "on-hook" state is entered to terminate the call (Step 314).

Exemplary embodiments may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments. A computer program product comprises processor-executable instructions for responding to communications.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of responding to a communication, comprising:
    receiving the communication at a recipient device sent from a sender's communications address;
    querying a database stored in memory of the recipient device that associates stored voicemail messages to senders' communications addresses and to voicemail server addresses;

determining a mode of operation of the recipient device;
retrieving a rule from the database that is associated with the mode of operation of the recipient device;
retrieving a stored voicemail message from the database that is associated with the sender's communications address and that is associated with the mode of operation of the recipient device;
querying the database stored in the recipient device for a telephone number associated with the sender's communications address;
auto-dialing the telephone number to establish a call from the recipient device to the telephone number; and
playing the stored voicemail message during the call to respond to the communication.

2. The method according to claim 1, wherein retrieving the stored voicemail message comprises retrieving a prerecorded voicemail that has been pre-recorded by the recipient and associated with the sender's communications address.

3. The method according to claim 1, further comprising:
retrieving a voicemail server address from the database that is associated with the sender's communications address; and
sending the stored voicemail message to a voicemail server at the voicemail server address in response to the communication, the stored voicemail message to be stored with voicemails for retrieval by a sender of the communication.

4. The method according to claim 1, further comprising automatically initiating a call from the recipient device to the sender's communications address and playing the stored voicemail message during the call.

5. The method according to claim 4, further comprising entering an off-hook mode of operation.

6. The method according to claim 1, further comprising:
retrieving a dialing plan that is stored in the memory of the recipient device;
comparing the sender's communications address to the dialing plan;
storing a database of communications addresses in the memory of the recipient device that associates the senders' communications addresses to alternate communications addresses;
retrieving another telephone number from the database of communications addresses that is associated with the sender's communications address and that is compatible with the dialing plan;
auto-dialing the another telephone number to establish another call from the recipient device to the another telephone number; and
playing the stored voicemail message during the another call to respond to the communication.

7. A system for responding to a communication, comprising:
a processor communicating with memory, the memory storing instructions for:
receiving the communication at a recipient device sent from a sender's communications address;
determining a mode of operation of the recipient device;
querying a table stored in memory of the recipient device that associates voicemail messages to senders' communications addresses, to modes of operation of the recipient device, and to voicemail server addresses;
retrieving a rule that is associated with the mode of operation of the recipient device;
retrieving a voicemail message that is associated with the sender's communications address and with the mode of operation of the recipient device;
querying the table for a telephone number associated with the sender's communications address;
automatically initiating a call from the recipient device to the telephone number;
receiving an acknowledgment produced by the sender's device that indicates the call is established; and
playing the voicemail message during the call as a response to the communication.

8. The system according to claim 7, the memory further storing instructions for pre-recording the voicemail message.

9. The system according to claim 7, the memory further storing instructions for terminating the call after the voicemail message is played.

10. A non-transitory computer readable medium storing computer-readable instructions for performing a method, the method comprising:
receiving the communication at a recipient device sent from a sender's device at a sender's communications address;
determining a mode of operation of the recipient device;
querying a table stored in memory of the recipient device that associates voicemail messages to senders' communications addresses, to modes of operation, and to voicemail server addresses;
retrieving a voicemail file that is associated with the sender's communications address and with the mode of operation of the recipient device;
retrieving a voicemail server address from the database that is associated with the sender's communications address;
sending the voicemail file to a voicemail server at the voicemail server address to be stored with voicemails for retrieval by a sender of the communication;
querying the table stored in the recipient device for a telephone number associated with the sender's communications address;
auto-dialing the telephone number to establish a call from the recipient device to the telephone number;
receiving an acknowledgement outside a voice band of the call that indicates the call has been answered;
playing the voicemail file during the call to respond to the communication; and
terminating the call after the voicemail file has been played.

11. The computer readable medium according to claim 10, wherein the acknowledgment is a tone indicating a telephony connection is established.

12. The computer readable medium according to claim 10, wherein the acknowledgment is a data message indicating a telephony connection is established.

13. The computer readable medium according to claim 10, further comprising instructions for:
retrieving a dialing plan that is stored in the memory of the recipient device; and
comparing the sender's communications address to the dialing plan.

14. The computer readable medium according to claim 10, further comprising instructions for entering an on-hook state to terminate the call.

15. The computer readable medium according to claim 10, further comprising instructions for entering an off-hook state when auto-dialing the telephone number.

* * * * *